United States Patent Office 3,165,180
Patented Jan. 12, 1965

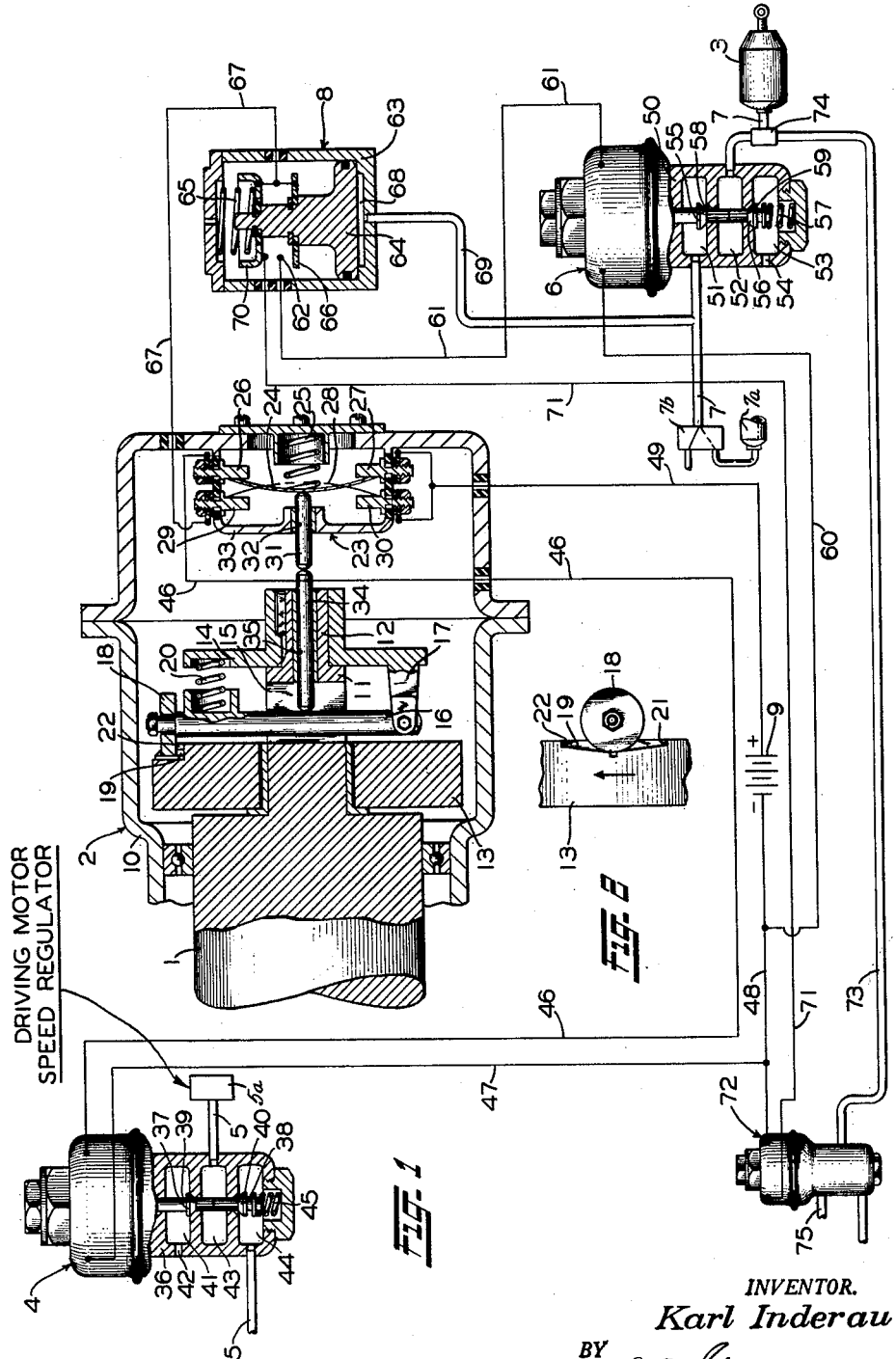

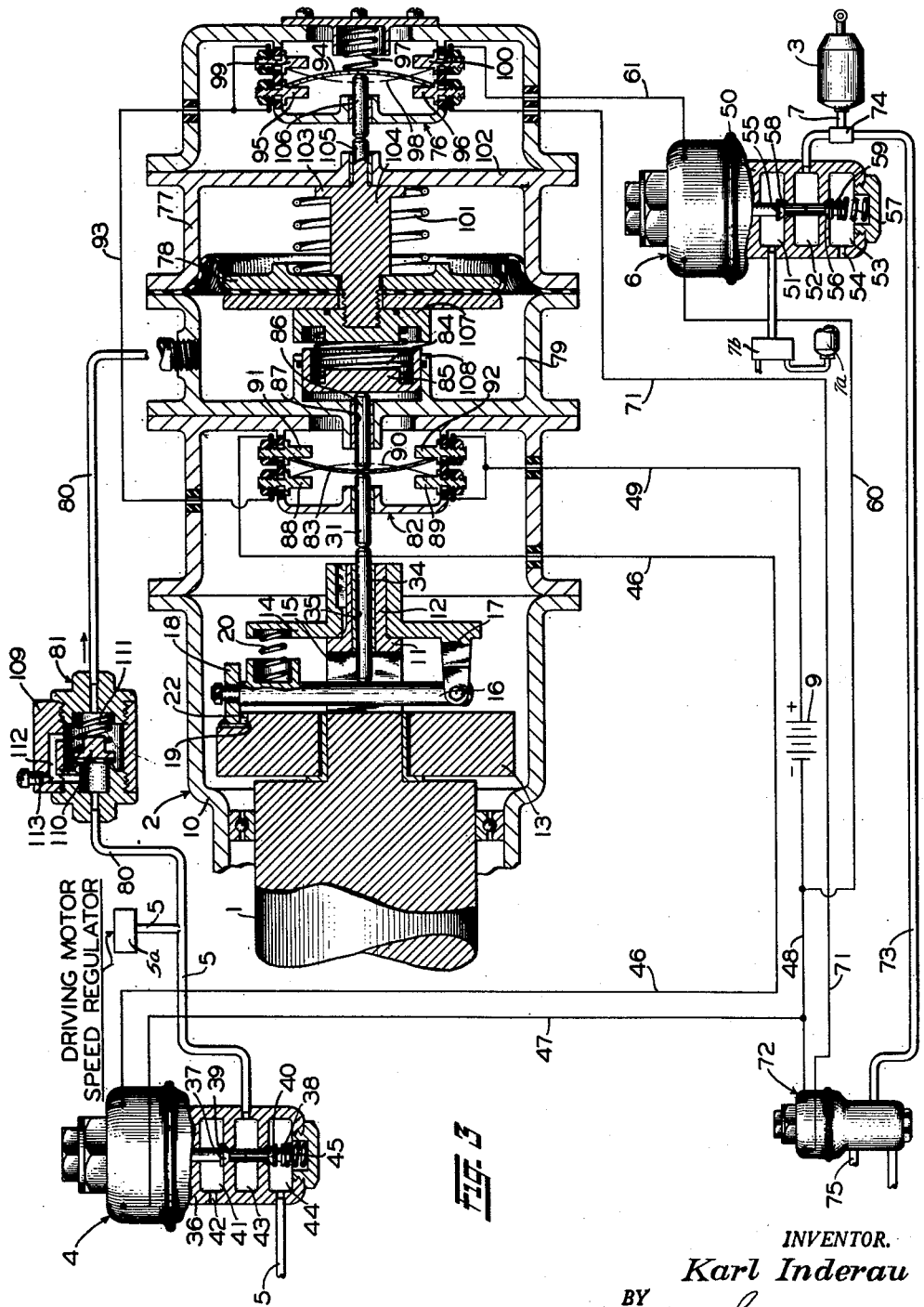

3,165,180
COMBINATION VEHICLE WHEEL SPIN AND
WHEEL SLIDE CONTROL APPARATUS
Karl Inderau, Hannover, Germany, assignor to Westinghouse-Bremsen-Gesellschaft, m.b.H., Hannover, Germany
Filed June 22, 1961, Ser. No. 118,913
Claims priority, application Germany June 24, 1960
12 Claims. (Cl. 192—3)

This invention relates to wheel-spin and wheel-slide preventing apparatus and, more particularly, to such apparatus comprising a unitary apparatus performing the dual function of preventing both wheel-spin and wheel-slide rather than having separate apparatus for performing the respective functions.

The term "wheel-spin," as used hereinafter, shall refer to that condition in which the angular rate of speed of a vehicle wheel or wheels exceeds the linear rate of speed of the vehicle. Wheel-spin usually occurs during application of propulsion power to the wheel or wheels for propelling the vehicle and when the applied forces of propulsion exceed the prevailing tractive forces, whereby the wheel or wheels are caused to spin. Imminency of wheel-spin is recognized upon angular acceleration of the wheel or wheels at a rate greater than the linear rate of vehicle acceleration. The term "wheel-slide," as used hereinafter, shall refer to that condition in which the vehicle wheel or wheels are dragged along the running or rail surface in a locked state. Wheel-slide usually occurs as a result of the application of retarding forces to the wheel or wheels in excess of the prevailing tractive forces, and imminency of such wheel-slide is recognized by angular deceleration of said wheel or wheels at a rate exceeding the linear rate of deceleration of the vehicle.

Wheel-slide inhibiting apparatus and devices, as well as those for inhibiting wheel-spin, are well known. Because of the respective functional nature of these well-known devices, however, if it is desired to equip a railway locomotive, for example, with such devices, the locomotive must be equipped with separate devices or apparatus for providing the desired control over the respective conditions that cause wheel-spin and wheel-slide. Such installation may be so complex as to become impractical or, certainly, to provide a greater possibility of malfunctioning due to the additional equipment, as well as being costly.

It is the principal object of this invention to provide a unitary control apparatus characterized by its capability of responding, at any given instant, to the existing rotative condition of the vehicle wheels with which it is associated to function automatically for inhibiting or correcting any undesired rotative condition of said vehicle wheels either of a spinning or a sliding nature. Briefly, the invention comprises a rotary inertia device associated with the vehicle wheels desired to be controlled, said inertia device being operable, in response to a discrepancy in relative rate of rotation between a rotary mass in said inertia device and the wheels, to effect operation of an electrical switch which, upon occurrence of wheel-spinning, closes a wheel-spin control circuit for effecting a momentary cut-off or reduction of propulsion power and a limited brake application on the affected wheels until normal rotation thereof is restored, or upon indication of an impending wheel-sliding condition during a brake application, closes a wheel-slide control circuit for effecting a momentary release of the brake application on the affected wheels until normal rotation thereof is restored. A fluid pressure responsive switch is employed for selectively establishing either the wheel-spin or the wheel-slide control circuit, said pressure switch having one position, in the absence of fluid pressure in the brake cylinder, to activate the wheel-spin control circuit and being operable, in response to fluid pressure supplied to the brake cylinder, to activate the wheel-slide control circuit.

In the drawings, FIG. 1 is a schematic representation, partly in section, of one form of a control apparatus embodying the invention; FIG. 2 is a fragmentary view of a portion of one of the components of the control apparatus; and FIG. 3 is a schematic representation, partly in section, of another form of a control apparatus embodying the invention.

*Description and Operation—FIG. 1*

In FIG. 1, for purposes of illustrating the application of the invention, only a portion of an axle 1 of a vehicle wheel-axle unit of a railway locomotive is shown, it being understood that the locomotive is equipped with a plurality of such wheel-axle units (not shown) each consisting of an axle having a wheel or driver (not shown) mounted at each end thereof for rotation therewith and through which wheel-axle units propulsion is applied to the wheels for driving the locomotive, it being the purpose of the invention to correct or inhibit any contingent spinning or sliding of the wheels. It should also be understood that each set of wheel-axle units desired to be so controlled should be equipped with a control apparatus embodying the invention and presently to be described. Throughout the specification, where feasible, like reference numerals will be assigned to similar parts appearing in the several figures of the drawings.

The control apparatus shown in FIG. 1 comprises a rotary inertia device 2 supported adjacent one end of axle 1, a brake cylinder device 3 employed in the usual manner for effecting application and release of brakes (not shown) associated with the wheels mounted on said axle, an electro-magnet valve device 4 for controlling communication through a fluid pressure supply conduit 5 via which operating fluid pressure is supplied to a driving motor speed controller or regulator 5a illustrated diagrammatically in the drawings for controlling the speed of a driving motor (not shown) of any suitable type for driving the axle 1 at a speed corresponding to the degree of fluid pressure supplied to said speed regulator, an electro-magnet valve device 6 for controlling communication through a brake cylinder supply conduit 7 via which fluid pressure from a source of fluid under pressure 7a may be supplied to and released from said brake cylinder device under the control of any suitable control valve device of the well-known types which may be controlled remotely and for purposes of illustration is shown diagrammatically and designated by the reference numeral 7b, a fluid pressure operable selector electrical switch device 8 operable responsively to fluid pressure supplied to said brake cylinder device, electrical circuitry (to be described in more detail hereinafter) whereby said electro-magnet valve devices may be operably energized, and a source of electrical energy such as a battery 9, for example, for providing electrical energy for the electro-magnet valve devices.

The rotary inertia device 2, as shown in FIG. 1, comprises a non-rotative casing 10 supported adjacent one end of the axle 1 in coaxial relation there to and in suitable manner not fully shown, said end of said axle terminating in said casing with two diametrally reduced or stepped-down portions 11 and 12. A rotary inertia mass or flywheel 13 is coaxially carried on the larger-diameter portion 11 of axle 1 in rotatable relation thereto adjacent the inner end of casing 10, while a drive member 14 is removably fixed on the smaller-diameter terminal portion 12 of said axle for rotation therewith. The larger-diameter portion 11 of axle 1 is provided with a diametrally disposed slot 15 through which a roller-carrying lever 16 passes in transverse relation to the axle, said lever being pivotally anchored at one end to a bifurcated bracket 17 axially extending toward the flywheel 13 from a diametral extremity of the drive member 14, the other end of said roller-carrying lever having a roller 18 rotatably mounted thereon for circumferential rolling contact with a cam groove 19 of defined length formed in the adjacent face of said flywheel adjacent the flywheel periphery.

A spring 20 is compressed between the drive member 14 and the end of lever 16 adjacent the roller 18 for biasing said roller into the cam groove 19, which is in the form of a shallow V having respective stop shoulders 21 and 22 formed at each extremity of the V for limiting rolling movement of said roller in one direction or the other from the nadir of the V-shaped cam groove upon angular displacement of the flywheel 13 out of a normal position relative to the axle 1, in a manner to be hereinafter described and in which position said roller rests in the apex of said V-shaped groove. FIG. 2, which is a view of the roller 18 and the cam groove 19 as they would appear by looking downwardly on FIG. 1, more clearly shows the relationship of said roller and groove when flywheel 13 is in its normal position.

An electrical switch device 23, which is mounted in casing 10 adjacent the outer end thereof, comprises an arched, elastic switch member 24 biased, by a spring 25 compressed between said casing and said switch member, toward a first position in which it is shown in the drawing and in which the extremities of said switch member makes contact with respective contact elements 26 and 27. Upon application of a force on the switch member 24 in opposition to the biasing force of spring 25 and sufficient for overcoming said biasing force, said switch member, due to its elasticity, is forced to bend in a reverse arch, as shown by the broken line 28 in the drawing, to a second position in which the extremities of said switch member makes contact with a different set of respective contact elements 29 and 30.

The force for causing operation of the switch member 24 from its first to its second position is applied through an axially movable rod 31 disposed in a guide bore 32 formed in an internal casing wall 33 enclosing the switch device 23, said guide rod having one end in perpendicular abutting relationship with the switch member 24 on the side opposite spring 25, while the other end of said rod abuts against an adjacent end of an axially aligned and movable stem 34. Stem 34 extends from rod 31 through a guide bore 35 formed in the smaller-diameter portion 12 of axle 1 and terminates with the other end abutting lever 16 perpendicularly to the axis and substantially intermediately the ends of said lever, whereby, upon clockwise pivotal movement (as viewed in the drawing) of said lever about its anchor point on bracket 17 out of a normal position in which it is shown in the drawing and as will be more fully explained hereinafter, stem 34 and rod 31 are caused to move axially in a right-hand direction, as viewed in the drawing, for effecting operation of switch member 24 from its first position to its second position. When lever 16 is restored to its normal position, biasing spring 25 acts to restore switch member 24 to its said first position.

The electro-magnet valve device 4, which is interposed in conduit 5 for controlling communication therethrough and therefore supply and relief of operating fluid pressure to and from, respectively, the driving motor regulator 5a for controlling the speed of the driving motor for axle 1, may be the usual type comprising a casing 36 having therein a solenoid (not shown) and a pair of valves 37 and 38 operable cooperatively with respective valve seats 39 and 40 formed in said casing. Casing 36 has formed therein an atmospheric chamber 41 open to atmosphere via a vent port 42, a delivery chamber 43 connected to the delivery side of conduit 5 leading to the driving motor regulator, and an inlet chamber 44 connected to the supply side of conduit 5. With the solenoid energized, the pair of valves 37 and 38, acting in unison through respective axially-aligned valve stems associated therewith in end-to-end abutting relationship, is moved, against the opposing biasing action of a spring 45 acting on said valves, to a supply position in which valve 37 is seated on valve seat 39 and valve 38 is unseated from valve seat 40 to cut off communication between delivery chamber 43 and atmospheric chamber 41 and to open communication between inlet chamber 44 and said delivery chamber, respectively, whereby fluid under pressure is supplied to the driving motor regulator. When the solenoid of the electro-magnet valve device 4 is deenergized, in a manner hereinafter noted, spring 45 is effective for moving the pair of valves 37 and 38 to a cut-off position in which valve 38 is seated on valve seat 40 and valve 37 is unseated from valve seat 39 to cut off communication between inlet chamber 44 and delivery chamber 43 and to open communication between said delivery chamber and atmospheric chamber 41, respectively, whereby the driving motor regulator is relieved of operating fluid pressure to atmosphere via vent port 42.

One terminal of the solenoid (not shown) of the electro-magnet valve device 4 is connected by an electrical conductor 46 to contact element 26 of switch device 23, while the other terminal of said solenoid is connected by an electrical conductor 47 to an electrical conductor 48 leading from one terminal of the battery 9. The other terminal of battery 9 is connected by an electrical conductor 49 to the contact elements 27 and 30 of switch device 23. Thus, with switch member 24 of the switch device 23 in its first position (as shown in the drawing), the solenoid of the electro-magnet valve device 4 is in an electrically energized state by virtue of the closed electrical circuit comprising said solenoid, the conductors 47 and 48, the battery 9, conductor 49, contact element 27, switch member 24, contact element 26 and conductor 46, whereby the pair of valves 37 and 38 is in its supply position (as shown in the drawing).

The electro-magnet valve device 6, which is interposed in the brake cylinder supply conduit 7 for controlling communication therethrough and, therefore, supply and relief of pressurized fluid to and from, respectively, the brake cylinder device 3, is generally similar in structure to the electro-magnet valve device 4. The electro-magnet valve device 6 comprises a casing 50 having therein an inlet chamber 51, a delivery chamber 52 and an atmospheric chamber 53, said chambers being connected respectively to the supply side of conduit 7, the delivery side of conduit 7 and an atmospheric vent port 54. Communication between the several chambers is controlled by a pair of valves 55 and 56 acting in unison through respective axially-aligned valve stems associated therewith in end-to-end abutting relationship, said pair of valves being biased by a spring 57 toward a normal position in which valve 55 is unseated from a valve seat 58 to open communication between inlet chamber 51 and delivery chamber 52, and valve 56 is seated on a valve seat 59 to cut off communication between delivery chamber 52 and atmospheric chamber 53.

Energization of a solenoid (not shown) in the electro-magnet valve device 6 causes the pair of valves 55 and 56 to be operated to a relief position in which valve 55 is seated on valve seat 58 to cut off communication between inlet chamber 51 and delivery chamber 52, and valve 56 is unseated from valve seat 59 to open communication between delivery chamber 52 and atmospheric chamber 53, whereby the brake cylinder device 3 is relieved of operating fluid pressure.

One terminal of the solenoid in the electro-magnet valve device 6 is connected by a conductor 60 to conductor 48 leading from one terminal of battery 9, while the other terminal of said solenoid is connected by a conductor 61 to a fixed contact element 62 in the pressure switch device 8.

The pressure switch device 8 comprises a casing 63 having therein a piston 64 biased by a spring 65 toward a normal position in which a switch member 66 carried by said piston occupies an open position out of contact with the contact element 62. Switch member 66 is connected to one end of an electrical conductor 67, the other end of said conductor being connected to contact element 29 of the switch device 23.

One side of piston 64 is subjected to pressure of fluid in a chamber 68 which is connected via a branch conduit 69 to the supply side of the brake cylinder supply conduit 7. Therefore, when conduit 7 is charged with operating fluid pressure via a supply communication designated diagrammatically by a broken line in the control valve device 7b for supplying the brake cylinder device 3 for effecting a brake application during normal brake operations of the braking system, chamber 68 of the pressure switch device 8 is also charged with fluid pressure via branch conduit 69 to cause piston 64 to be moved, against opposing force of spring 65, to a contact position in which the switch member 66 occupies a closed position in contact with contact element 62 for a purpose to be hereinafter explained.

The pressure switch device 8 further comprises a contact element 70 to which the end of conductor 67 connected to switch member 66 is also connected. The contact element 70 is also provided with a terminal to which one end of a conductor 71 is connected to thereby provide an electrical connection, through said contact element, between conductors 67 and 71. The other end of conductor 71 is connected to one terminal of an electro-magnet valve device 72 which, similarly to the electro-magnet valve device 4, has a pair of cooperatively functioning valves having a cut-off position, when the electro-magnet valve device is deenergized, in which position communication through a conduit 73 leading from a low pressure source of fluid under pressure and connecting to conduit 7 via a double check valve device 74, is cut off and said conduit 73 is vented to atmosphere via a vent port 75. When the electro-magnet device 72 is energized, as will hereinafter be described, the pair of valves therein is operated to a supply position in which communication through conduit 73 is open and the brake cylinder device 3 is supplied with fluid at a relatively low degree of pressure as compared to the degree of fluid pressure required for normal braking operations, to cause a relatively light braking effect on the wheels for correcting or terminating the conditions causing wheel-spin. This operation will be more fully described hereinafter, but it should be noted at this point that when fluid at low pressure is supplied via conduit 73 to the brake cylinder device 3 for correcting wheel-spin, the double check valve device 74 operates to prevent flow of such fluid (by way of conduit 7, valve device 6 and branch conduit 69) to chamber 68 of the pressure switch device 8. Spring 65 in the pressure switch device 8, therefore, is unaffected by any opposing pressure acting on piston 64 and said piston remains in its normal position during such wheel-spin correcting operation. The other terminal of the electro-magnet valve device 72 is connected to an extension of conductor 48.

In considering the operation of the embodiment of the invention shown in FIG. 1 and as above described, each function, that is, the prevention of wheel-spinning and the prevention of wheel-sliding, will be treated separately.

In considering the operation of the control apparatus for preventing wheel-spin, which usually occurs during application of propulsion power for accelerating the train, let it be assumed that brake cylinder supply conduit 7 and, therefore, brake cylinder 3 are void of fluid pressure and that fluid under pressure via conduit 5 (with the electro-magnet valve device 4 energized in the manner above noted) for the driving motor regulator 5a of the driving motor for axle 1 has been effected by the operator of the locomotive, whereby propulsion force is applied to the wheels on said axle (as well as the other wheels on the locomotive) for driving the locomotive. Under normal condition, that is, with maximum traction between the wheels and the rails and with the propulsion force applied to said wheels being compatible with the existing traction, there should be no spinning of the wheels and, in the absence of wheel-spin, the angular acceleration thereof coincides with linear acceleration of the vehicle or locomotive. Under these conditions the flywheel 13 of the inertia control device 2 is rotated at the same rate as the axle through a driving connection comprising the driving member 14, lever 16 and the roller 18 which is biased by spring 20 into the cam groove 19.

If, however, the tractive friction between the driving wheels and the rails is below normal due to wet or oily condition of the rails, for example, or if the load on said driving wheels is excessive due to an unusually long train coupled to the locomotive, the propulsion force applied to the driving wheels may be excessive in relation to the existing traction between the wheels and the rails and thereby cause acceleration of the wheels at a rate exceeding the linear rate of acceleration of the locomotive. These conditions, which signal imminent wheel-spin, unless corrected, occur with such rapidity that rotation of the flywheel or inertia mass 13 immediately lags in rotative relation to the axle 1 to produce relative angular displacement therebetween. If the axle and flywheel 13 are rotating in the direction indicated by the arrow in FIG. 2, as the rotative rate of axle 1 exceeds the rotative rate of flywheel 13, said axle causes the roller 18 carried on the lever 16, which is rigidly driven by the driving member 14, to be rolled along the inclined surface of cam groove 19 toward the stop shoulder 22 which limits further angular displacement between said axle and said flywheel.

Due to the cam action between groove 19 and roller 18, as roller 18 rolls along the inclined surface of groove 19, lever 16 is caused to be pivoted in a clockwise direction, as viewed in the drawing, about its pivotal connection with bracket 17. The clockwise pivoting action of lever 16, which abuts against the end of stem 34, causes said stem to be displaced axially to the right, as viewed in the drawing, to impart similar axial movement to the switch operating rod 31. Right-hand axial movement of rod 31 causes the switch member 24 to be shifted from its first position, and, therefore, out of contact with contact elements 26 and 27, to its second position in contact with contact elements 29 and 30.

When switch member 24 moves out of contact with contact elements 26 and 27, the circuit (above described) for energizing the solenoid of the electro-magnet valve device 4 is opened to cause deenergization of said solenoid and, therefore, operation of the pair of valves 37 and 38 to its cut-off position, as above described, whereupon operating fluid pressure to the driving motor regulator 5a is cut off and the driving motor regulator vented to atmosphere via vent port 42 to thereby cut off propulsion power to the axle 1 and the driving wheels associated therewith. Moreover, when switch member 24 makes contact with contact elements 29 and 30, a circuit (for energizing the electro-magnet valve device 72 connected to conductors 48 and 71) comprising said switch member, contact element 29, conductor 67, contact element 70, conductor 71, the solenoid of said electro-magnet valve device, conductor 48, battery 9, conductor 49 and contact element 30 is thereby closed, whereby a relatively light brake application is effected on the spinning wheels on the axle 1, as above noted, to restore the rotative rate of acceleration of said wheels to a rate coinciding with the linear rate of acceleration of the locomotive.

Thus, with the apparatus operating, as above described, to simultaneously cut off propulsion power and effect a light brake application on the spinning wheels, said wheels are rapidly restored to normal rotation, whereupon the flywheel 13 resumes a normal rotative position relative to the axle 1, with the roller 18 resting in the nadir of the cam slot 19, and spring 25 is effective for restoring switch member 24 of the switch device 23 to its first position. The electro-magnet valve device 72 is thereby deenergized to effect release of actuating fluid pressure from brake cylinder device 3 via conduit 73 and vent port 75 and, therefore, the retarding action on the affected wheels, and energization of the electro-magnet valve device 4 is restored for re-establishing supply of operating fluid pressure to the driving motor regulator 5a of axle 1. Each time imminency of spinning of any of the locomotive wheels occurs, therefore, the respective apparatus associated with the spinning wheels functions, as above described, to automatically prevent such spinning.

In considering the operation of the embodiment of the invention shown in FIG. 1 for preventing wheel-sliding, let it be assumed that, while the locomotive is in motion, the operator initiates a brake application of normal magnitude for retarding the locomotive, which, as above noted, establishes brake applying fluid pressure in the brake cylinder device 3 via conduit 7. Fluid under pressure, therefore, is supplied via branch conduit 69 to chamber 68 of the fluid pressure switch device 8, whereupon piston 64 is operated to its contact position in which switch member 66 is in contact with contact element 62. With switch member 66 in contact with contact element 62, the apparatus is thus placed in condition to prevent or correct wheel-sliding as will presently be described.

Assuming, that upon initiation of a brake application by the operator, such application or retarding action is excessive in relation to the existing tractive condition between the locomotive wheels and the rail. Under such conditions the angular deceleration of the wheels on axle 1, for example, will be greater than the linear deceleration of the locomotive, thereby signalling imminency of wheel-slide. The flywheel 13, therefore, rotating in the direction indicated by the arrow in FIG. 2, overruns said axle and is angularly displaced relative thereto until the roller 18 rests against the shoulder 21, whereupon further angular displacement between the flywheel and the axle ceases.

Upon angular displacement of the flywheel 13 relative to the axle 1, the rotary inertia device 2 operates in a manner similar to that above described in connection with the wheel-spin correcting operation to cause operation of the switch member 24 from its first position to its second position in which contact elements 29 and 30 are connected. The electro-magnet valve device 4 operates, as above described, to cut off or reduce operating fluid pressure supply to the driving motor regulator 5a via conduit 5 and vent such operating fluid pressure via port 42, if not already having been effected by operator's independent controls (not shown) prior to initiation of the brake application.

With switch member 24 in its second position and with piston 64 of the pressure switch device 8 in its contact position, the electro-magnet valve device 6 is energized by an electrical circuit comprising the solenoid (not shown) of said electro-magnet valve device, conductor 60, conductor 48, battery 9, conductor 49, contact element 30, switch member 24, contact element 29, conductor 67, switch member 66, contact element 62 and conductor 61. Energization of the electro-magnet valve device 6 effects operation of the pair of valves 55 and 56 out of its normal position to its relief position to effect relief of operating fluid pressure from the brake cylinder device 3, as above described. Relief or reduction of fluid pressure from the brake cylinder device 3 and, therefore, corresponding release or reduction of the brake application on the wheels, permits said wheels to resume rotational speed corresponding to linear speed of the locomotive, whereupon the flywheel 13 resumes its normal angular position relative to the axle 1 in which roller 18 resumes its position in the nadir of cam groove 19. Thus, the switch member 24 is restored to its first position, in the manner above described, to effect re-energization of the electro-magnet valve device 4.

With switch member 24 restored to its first position, the circuit above defined for energizing the electro-magnet valve device 6 is opened, and said electro-magnet valve device is therefore deenergized to permit restoration of the pair of valve 55 and 56 to its normal position for restoring fluid pressure supply communication via conduit 7 to the brake cylinder device 3. Each time wheel-sliding becomes imminent, therefore, the apparatus embodying the invention functions in the manner above described to automatically prevent such wheel-sliding.

*Description and Operation—FIG. 3*

The embodiment of the invention as shown in FIG. 3 is generally similar to that shown in FIG. 1 with the exception that the fluid pressure electrical switch device 8 is replaced by a fluid pressure operated electrical selector switch device 76 enclosed adjacent the outer extremity of a supplementary casing 77 mounted to the outer extremity of and in axial alignment with casing 10. The switch device 76 is actuated by a diaphragm piston 78 disposed in supplementary casing 77 and subjected on one side thereof to fluid pressure in a chamber 79 defined by said diaphragm and a portion of casing 77 adjacent casing 10. Chamber 79 is charged with fluid under pressure via a branch conduit 80 connected to conduit 5 so that diaphragm piston 78 is operable responsively to pressure of operating fluid supplied to the driving motor regulator 5a as compared to operation of piston 64 of the pressure switch device 8 shown in FIG. 1, which is subjectable to pressure of fluid supplied to the brake cylinder device 3. A return check valve device 81 is interposed in branch conduit 80 for a purpose to be hereinafter noted.

Similarly as in the embodiment of the invention shown in FIG. 1, the embodiment shown in FIG. 3 has an electrical switch device 82 disposed in casing 10 and operable by the rotary inertia device 2 in similar fashion as the switch device 23 shown in FIG. 1. The switch device 82 comprises an arched, elastic switch member 83 biased, in this embodiment, by a caged spring 84 disposed in chamber 79 and compressed between the diaphragm piston 78 and an axially movable spring seat member 85. The spring seat member 85 abuts against one end of a push rod 86, which slidably extends through a bore 87 formed coaxially in the abutting end walls of casings 10 and 77 so as to have its other end in perpendicular abutting relation to the switch member 83, whereby, said switch member is biased by spring 84, acting through said seat member and said push rod, toward a first position in which it is shown in the drawing and in which the opposite extremities of said switch member are in contact with respective contact elements 91 and 92. The switch member 83 is operable by the axially movable rod 31, in a manner similar to switch member 24 of the switch device 23 (FIG. 1) and against the opposing biasing force of spring 84, to a second position, indicated by a broken line 90 in which the opposite extremities of said switch member 83 are in contact with respective contact elements 88 and 89.

The contact elements 89 and 92 are both connected to conductor 49, while contact element 91 is connected to conductor 46, and contact element 88 is connected to one end of an electrical conductor 93.

The fluid pressure operated switch device 76, which is constructed and functions similarly to the switch device 82, also comprises an arched, elastic switch member 94 having a deenergizing position, in which it is shown in the drawing and in which the extremities of said switch member are in contact with respective contact elements 95 and 96. The switch member 94 is biased by a spring 97 toward and operable to an energizing position, indicated by a broken line 98 in the drawing, in which position the switch member makes contact with a set of contact elements 99 and 100. Contact elements 95 and 99 are both connected to the other end of conductor 93, while contact elements 96 and 100 are connected to conductors 71 and 61 respectively.

Switch member 94 is operated to its deenergizing position, in contact with contact elements 95 and 96, when diaphragm piston 78 is operated to a retaining position responsively to fluid pressure in chamber 79 above a certain predetermined value and sufficient for overcoming the opposing biasing action of a spring 101 compressed between said diaphragm piston and a transverse separating wall 102 fixed in casing 77 between said diaphragm piston and the switch device 76, said retaining position being defined by abutment of a collar 103, formed on a piston stem 104 coaxially carried by said diaphragm piston, with said separating wall. Piston stem 104 is provided with an extension 105 extending coaxially therefrom through separating wall 102 to make abutting contact with one end of an axially movable push rod having perpendicular abutting contact with the switch member 94 for retaining said switch member in its deenergizing position, against opposing force of spring 97, when diaphragm piston 78 is in its retaining position. When fluid pressure in chamber 79 is reduced to a value at which spring 101 is effective for moving diaphragm piston 78 in a left-hand direction, as viewed in the drawing, to a release position, spring 97 becomes effective for operating switch member 94 to its energizing position in contact with contact elements 99 and 100. The release position of diaphragm piston 78 is defined by abutting contact of a retaining nut 107 (for securing the piston stem 104 to said diaphragm piston) with a coaxially disposed cylindrical casing portion 108 in which the spring seat member 85 is slidably operable.

The return check valve device 81 is interposed in branch conduit 80 connected at one end to conduit 5 and at the other end to chamber 79 in casing 77, whereby said chamber is charged with fluid under pressure when supplied to the driving motor regulator. The check valve device 81 comprises a casing 109 having disposed therein a check valve 110 biased by a spring 111 toward a cut-off position, in which unrestricted flow of fluid under pressure from conduit 5 to chamber 79 is interrupted, said check valve being operable to an open position by fluid at a pressure sufficient for overcoming said spring, in which open position pressurized fluid may flow unrestrictedly through branch conduit 80 in a direction indicated by the arrow for charging chamber 79.

In order to accommodate venting or reduction of fluid pressure in chamber 79 when fluid pressure supply to the driving motor regulator 5a is cut off by operation of electromagnet valve device 4, check valve device 81 has a passageway 112 which provides a restricted open communication through branch conduit 80 in by-passing relation to the check valve 110 when said check valve is in its cut-off position. Venting of chamber 79 by way of passageway 112 is restricted to a preselected rate, for a purpose to be hereinafter stated, by an adjustable needle valve 113 extending into said passageway.

Since the embodiment of the invention, as shown in FIG. 3, functions in generally similar fashion to that shown in FIG. 1, with some exceptions as will be noted, to correct both wheel-spin and wheel-slide, each of these functions will be considered separately but in somewhat less detail than the treatment relating to FIG. 1.

Therefore, in considering the wheel-spin correcting operation of the apparatus shown in FIG. 3, let it be assumed that chamber 79 is charged with fluid pressure as a result of such pressure having been supplied to the driving motor regulator 5a, and that said pressure is of sufficient degree for maintaining diaphragm piston 78 in its retaining position. Upon occurrence of conditions indicating imminency of wheel-spin during propulsion of the vehicle, the rotary inertia device 2 operates in the manner above noted to cause switch member 83 to move from its first position to its second position to deenergize the electro-magnet valve device 4 and thereby cut off fluid pressure to the driving motor regulator 5a and to chamber 79. When rod 31 effects movement of switch member 83 from its first to its second position, resulting axial movement of rod 86 is absorbed by compression of caged spring 84 between spring seat 85 and retaining nut 107.

Upon deenergization of electro-magnet valve device 4, as a result of switch member 83 being shifted from its first to its second position, a circuit for energizing the wheel-spin brake applying mechanism (electro-magnet valve device 72) for causing a relatively light braking effect on the spinning wheels is closed, and the spinning effect is thereby prevented, said circuit comprising the solenoid valve (not shown) of said electro-magnet valve device, conductor 48, battery 9, conductor 49, contact element 89, switch member 83, contact element 88, conductor 93, contact element 95, switch member 94, contact element 96 and conductor 71. Due to the short interval of time required by the apparatus for effecting termination of the conditions indicating imminent wheel-spin and due to the restricted and delayed venting of chamber 79 as controlled by pre-setting of needle valve 113, venting of fluid pressure from said chamber is sufficiently delayed as to prevent opposing force of spring 101 from becoming effective for moving diaphragm piston 78 toward its release position, whereby said piston is held in its retaining position to prevent operation of switch member 94 from the position in which it is shown in the drawing and in which electro-magnet valve device 6 remains deenergized.

When wheel-spinning is terminated, switch member 83, in a manner similar to that of switch member 24 above described, is restored to its first position in which electro-magnet valve device 4 is re-energized and fluid pressure supply to the driving motor regulator 5a and chamber 79 is restored.

In considering the operation of the apparatus, as shown in FIG. 3, for correcting or preventing wheel-slide, which normally occurs during and as a result of an excessive brake application relative to existing tractive friction, let it be assumed that the brake application, as effected, is excessive and that wheel-slide results or becomes imminent so as to cause the wheels to decelerate at a rate greater than the rate of linear deceleration of the vehicle. Prior to effecting a brake application, the operator, of course, would normally cut off propulsion power. Let it be assumed, therefore, that the operator has cut off (by independently operable controls not shown) fluid pressure supply to the driving motor regulator 5a and to chamber 79, whereupon venting of said chamber, at a restricted rate, occurs by reverse flow past needle valve 113. The restricted rate of venting of chamber 79 is determined by the adjustment of needle valve 113, said valve being so adjusted as to permit sufficient venting of fluid pressure from said chamber, during the normal interval of time lapsed from the moment fluid pressure supply to the driving motor regulator 5a is cut off until conditions indicating imminency of wheel-slide may occur, to render spring 101 effective for operating piston 78 to its release position, as above noted, in which switch member 94 is then operated by spring 97 out of its deenergizing position in contact with elements 95 and 96 to its energizing position in contact with elements 99 and 100. Thus, if wheel-slide occurs or becomes imminent so as to cause relative displacement of flywheel 13 with the axle, the rotary inertia device 2, in a manner similar to that above described in connection with the operation of switch member 24 of switch device 23, operates to effect movement of switch member 83 from its first position to its second position, in which the electro-magnet valve device 6 is energized by way of a circuit comprising the solenoid (not shown) of said electro-magnet valve device, conductor 60, conductor 48, battery 9, conductor 49, contact element 89, switch member 83, contact element 88, conductor 93, contact element 99, switch member 94, contact element 100 and conductor 61.

With electro-magnet valve device 6 energized, the pair of valves 55 and 56 is operated to its relief position in which the brake cylinder device 3 is relieved of fluid pressure for effecting a momentary release of the brake application on the wheels to permit restoration of wheel speed to the linear speed of the vehicle. When the wheels regain a rate of rotation corresponding to the linear speed of the vehicle, so that flywheel 13 resumes its normal position relative to axle 1, switch member 83 resumes its first position to thereby break the circuit by which electro-magnet valve device 6 was energized and thereby cause the pair of valves 55 and 56 to be restored to its supply position in which fluid under pressure is again supplied to the brake cylinder 3 to restore the brake application.

Since supply of fluid under pressure to the driving motor regulator 5a is kept cut off by the operator as long as he has the brakes applied, chamber 79 remains vented and, therefore, switch member 94 remains in its energizing position. Thus, should wheel-slide indicating conditions recur during the time that the same brake application is in effect, the switch member 94 is maintained in position for permitting the electro-magnet valve device 6 to be energized during each occurrence of wheel-slide imminency and thereby effectively prevent actual wheel-slide. Of course, if the brake application in question is released, and a subsequent brake application is effected, during which wheel-slide indicating conditions occur, the apparatus embodying the invention functions, as above described, to automatically prevent wheel-slide during such subsequent brake application.

Having now described the invention, what I claim as new and desire to secure by Letters Patent, is:

1. In a control system for preventing spinning of a wheel-axle unit of a railway vehicle due to excessive application of propulsion torque thereto and for preventing sliding of the wheel-axle unit due to excessive brake application thereto, control apparatus comprising a rotary inertia device driven by rotation of the wheel-axle unit for sensing an imminent wheel-spin condition of the wheel-axle unit during propulsion and for sensing an imminent wheel-slide condition of the wheel-axle unit during a brake application thereon, switch means operated by said rotary inertia device from one position to another position incidental to sensing thereby of an imminent wheel-spin or wheel-slide condition, first electro-responsive means electrically connected to said switch means and operative responsively to energization upon operation of the switch means from its said one position to its said other position to cut off the application of propulsion power to the wheel-axle unit and effect a light brake application thereon to prevent wheel-spin, second electro-responsive means electrically connected to said switch means and operative responsively to energization upon operation of said switch means from its said one position to its said other position to release an existing brake application to prevent wheel-slide, a selector switch device electrically interposed between said switch means and said first and said second electro-responsive means, said selector switch device having a normal position, in which it provides a circuit for energizing said first electro-responsive means upon operation of said switch means to its said other position, and having a different position in which it provides a different circuit for energizing said second electro-responsive means upon operation of said switch means to its said other position, and means responsive to initiation of a control operation on the vehicle for causing said selector switch device to be operated from its said normal position to its said different position.

2. The combination, as defined in claim 1, further characterized in that the last-mentioned means comprises fluid pressure operable means for operating said selector switch device to its different position responsively to fluid pressure, and means for communicating fluid pressure to said fluid pressure operable means upon initiation of a brake application on the vehicle.

3. The combination, as defined in claim 1, further characterized in that the last-mentioned means comprises fluid pressure operable means operable in response to fluid pressure provided for controlling propulsion torque applied to the wheel-axle unit of the vehicle to operate said selector switch device to its said one position, and being operative, upon release of such torque controlling fluid pressure to operate said selector switch device to its said different position, and means via which such torque controlling fluid pressure may be communicated to and from said fluid pressure operable means.

4. In a propulsion and braking system of a railway vehicle of the type having a wheel-axle unit, a brake cylinder device operable responsively to fluid pressure for effecting a brake application on the wheel-axle unit and to relief of such pressure for effecting release of the brake application, and propulsion means for controlling application of propulsion torque to the wheel-axle unit, control apparatus for preventing wheel-spin and wheel-slide of the wheel-axle unit, said control apparatus comprising, in combination, a flywheel rotatable with the wheel-axle unit in a normal angular position relative thereto so long as the angular rate of speed of the wheel-axle unit corresponds to the linear rate of speed of the vehicle, said flywheel being capable of angular displacement relative to the wheel-axle unit upon occurrence of a discrepancy between the angular rate of speed of the wheel-axle unit and the linear rate of speed of the vehicle, a first electro-magnet valve device for controlling communication through a first supply conduit via which fluid at a certain low pressure may be supplied to the brake cylinder device for effecting a correspondingly light degree of brake application on the wheel-axle unit, said first electro-magnet valve device having a cut-off position, when deenergized, in which communication through said first supply conduit is closed and the brake cylinder device is vented to atmosphere, and being operable, when energized, to a supply position in which said communication is open, a second electro-magnet valve device for controlling communication through a second supply conduit via which fluid at a pressure higher than said certain low pressure may be supplied to the brake cylinder device for effecting a corresponding degree of brake application, said second electro-magnet valve device having a normal position, when deenergized, in which communication through said second supply conduit is open, and being operable, when energized, to a relief position in which communication through said second supply conduit is closed and the brake cylinder device is vented to atmosphere, electrical switch means having one position, in which a first electrical circuit associated with said first electro-magnet valve device may be closed for effecting energization of said first electro-magnet valve device, and being operable to a different position in which a second electrical circuit associated with said second electro-magnet valve device may be closed for effecting energization of said second electro-magnet valve device, means responsive to initiation of a control operation on the vehicle for causing said electrical switch means to be operated from its said one position to its said different position, and an electrical switch member having a first position in which both said first and second circuits are open and being operable by said angular displacement of said flywheel to a second position in which either the first circuit or the second circuit is closed, depending upon whether said electrical switch means is in its said one position or its said different position, respectively.

5. Control apparatus as defined in claim 4 wherein said electrical switch means is further characterized by piston means operable responsively to fluid supplied to the brake cylinder device via said second supply conduit at a pressure in excess of said certain low pressure for effecting operation of said electrical switch means to its said different position.

6. Control apparatus as defined in claim 4 further characterized by conduit means via which fluid under pressure is supplied for controlling the degree of propulsion power applied to the wheel-axle unit, the degree of propulsion power corresponding to the degree of fluid pressure supplied, piston means operable responsively to fluid pressure above a certain value supplied via said conduit means to a retaining position for retaining said electrical switch means in its said one position, biasing means effective, upon reduction of fluid pressure acting on said piston means to a value below said certain value, for moving said piston means to a release position in which said electrical switch means is operated to its different position, and timing means for delaying reduction of fluid pressure acting on said piston means for a predetermined period of time upon termination of supply of fluid pressure via said conduit means.

7. Control apparatus as defined in claim 4 further characterized by conduit means via which fluid under pressure is supplied for controlling the degree of propulsion power applied to the wheel-axle unit according to the degree of fluid pressure supplied and a third electro-magnet valve device interposed in said conduit means for controlling communication therethrough and constituting an element of an energizing circuit including said electrical switch member, said third electro-magnet valve device being effective when energized when said electrical switch member is in its said first position, for opening communication through said conduit means and effective when deenergized, upon operation of said electrical switch member to its said second position, for closing communication through said conduit means.

8. In a propulsion and braking system of a railway vehicle of the type having a wheel-axle unit to which propulsion power may be applied for driving the vehicle and brake applying means operable responsively to fluid pressure for effecting a brake application on the wheel-axle unit and to relief of such pressure for effecting release of the brake application, control apparatus for preventing wheel-spin and wheel-slide of the wheel-axle unit, said control apparatus comprising, in combination, a first electro-magnet valve device having a first position, when deenergized, in which pressurized fluid supply to the brake applying means is cut off, and being operable, when energized, to a second position in which supply of pressurized fluid to the brake applying means at a certain low value is effected, a wheel-spin preventing electrical circuit for controlling said first electro-magnet valve device and effective, when closed, for causing energization and operation of said first electro-magnet valve device to its said second position, a second electro-magnet valve device having a first position when deenergized, in which fluid at a pressure in excess of said certain low value may be supplied to the brake applying means, and being operable, when energized, to a second position in which the brake applying means is relieved of fluid pressure, a wheel-slide preventing electrical circuit for controlling said second electro-magnet valve device and effective, when closed, for causing energization and operation of said second electro-magnet valve device to its said second position, electrical switch means operatively connected to the brake applying means and having one position, in which said wheel-spin preventing circuit is conditioned for actuation, and being selectively operable out of said one position to a different position, in response to actuating fluid supplied to the brake applying means at said pressure in excess of said certain low value, in which different position said wheel-slide preventing circuit is conditioned for actuaton, an electrical switch member having a first position, in which both said wheel-spin and wheel-slide preventing circuits are open, and being operable to a second position in which either the wheel-spin or wheel-slide preventing circuit is actuated, depending upon the position of said switch means, and an inertia member having a normal position relative to the wheel-axle unit, in which normal position said switch member is in its said first position, so long as the angular rate of speed of the wheel-axle unit corresponds to the linear rate of speed of the vehicle, said inertia member being operable, in response to the occurrence of a discrepancy between said angular and linear rates of speed, to a different position to effect operation of said switch member to its said second position.

9. In a propulsion and braking system of a railway vehicle of the type having a wheel-axle unit, means for applying propulsion torque to the wheel-axle unit, a fluid pressure responsive speed regulator for controlling the degree of propulsion torque applied to the wheel-axle unit in accordance with the degree of fluid pressure supplied to the speed regulator and brake applying means operable responsively to fluid pressure for effecting a brake application on the wheel-axle unit and to relief of such pressure for effecting release of the brake application, control apparatus for preventing wheel-spin and wheel-slide of the wheel-axle unit, said control apparatus comprising, in combination, first conduit means via which fluid pressure may be supplied to the speed regulator, second conduit means via which fluid at a certain low pressure may be supplied to the brake applying means, third conduit means via which fluid at a pressure higher than said certain low pressure may be supplied to the brake applying means, an electrical wheel-spin preventing circuit, an electrical wheel-slide preventing circuit, a first electro-magnet valve device interposed in said second conduit means and electrically connected in said wheel-spin preventing circuit, said first electro-magnet valve device being effective, when energized, for causing fluid at said certain low pressure value to be supplied to said the brake applying means via said second conduit means for effecting a corresponding degree of brake application on the wheel-axle unit and, when deenergized, for cutting off said low pressure supply and venting the brake applying means to atmosphere, fluid pressure operable electrical switch means subject to fluid pressure in said third conduit means and electrically connected to said wheel-spin preventing and wheel-slide preventing circuits, said switch means having one position in which said wheel-spin preventing electrical circuit is closed for energizing said first electro-magnet valve device and being operable out of said one position, in response to fluid supplied to said brake applying means via said third conduit means for effecting a brake application, to a different position in which said wheel-spin preventing circuit is opened for deenergizing said first electro-magnet valve and said wheel-slide preventing electrical circuit is closed, a second electro-magnet valve device interposed in said third conduit means and electrically connected in said wheel-slide preventing circuit so as to be deenergized when said wheel-slide preventing circuit is open and energized when said wheel-slide preventing circuit is closed, said second electro-magnet valve being operative, when deenergized, for opening communication through said third conduit means and, when energized, for closing communication through said third conduit means and venting said brake applying means to atmosphere, an electrical switch member associated with said wheel-spin and wheel-slide preventing circuits and biased toward a first position in which both circuits are open, said electrical switch member being operable to a second position in which either the wheel-spin preventing circuit or the wheel-slide preventing circuit is closed, depending upon whether the fluid pressure operable switch means is in its said one position or its said different position, an inertia member having a normal position relative to the wheel-axle unit so long as the angular rate of speed of said wheel-axle unit corresponds to the linear rate of speed of the vehicle, said inertia member being operable out of said normal position, upon occurrence of a discrepancy between said angular and linear rates of speed, to a different position relative to the wheel-axle unit to cause operation of said electrical switch member to its said second position, a third electro-magnet valve device interposed in said first conduit means, said third electro-magnet valve device being effective, when electrically energized, for opening communication through said first conduit means and, when deenergized, for interrupting communication therethrough and venting the speed regulator to atmosphere, an energizing circuit in which said third electro-magnet valve device and said electrical switch member are electrically connected for effecting energization of said third electro-magnet valve device when said switch member is in its said first position and for effecting de-energization of said third electro-magnet valve device when said switch member is operated to its said second position, and biasing means for restoring said electrical switch member to its said first position upon restoration of said inertia member to its said normal position.

10. The combination as defined in claim 9, wherein said inertia member comprises a flywheel coaxially and rotatably supported on one end of an axle constituting a portion of the wheel-axle unit, said flywheel being rotatable with said axle in a normal angular position relative to said axle, so long as said angular and linear rates of speed coincide, in which normal position of said flywheel the electrical switch member is in its said first position, said flywheel being capable of limited angular displacement relative to said axle responsively to a variance between said angular and linear rates of speed for causing operation of said electrical switch member to its said second position.

11. In a propulsion and braking system of a railway vehicle of the type having a wheel-axle unit, means for applying propulsion torque to the wheel-axle unit, a fluid pressure responsive speed regulator for controlling the degree of propulsion torque applied to the wheel-axle unit in accordance with the degree of fluid pressure supplied to the speed regulator and brake applying means operable responsively to fluid pressure for effecting a brake application on the wheel-axle unit and to relief of such pressure for effecting release of the brake application, control apparatus for preventing wheel-spin and wheel-slide of the wheel-axle unit, said control apparatus comprising, in combination, first conduit means via which fluid pressure may be supplied to the speed regulator, second conduit means via which fluid at a certain low pressure may be supplied to the brake applying means, third conduit means via which fluid at a pressure higher than said certain low pressure may be supplied to the brake applying means, an electrical wheel-spin preventing circuit, an electrical wheel-slide preventing circuit, a first electro-magnet valve device interposed in said second conduit means and electrically connected in said wheel-spin preventing circuit, said first electro-magnet valve device being effective, when energized, for causing fluid at said certain low pressure to be supplied to the brake applying means via said second conduit means for effecting a corresponding degree of brake application on the wheel-axle unit and, when deenergized, for cutting off said low pressure supply and venting the brake applying means to atmosphere, electrical switch means having one position in which said wheel-spin preventing electrical circuit is closed for energizing said first electro-magnet valve device and being operable out of said one position to a different position in which said wheel-spin preventing circuit is opened for deenergizing said first electro-magnet valve device is deenergized and said wheel-slide preventing electrical circuit is closed, first biasing means for biasing said electrical switch means toward its said different position, a second electro-magnet valve device interposed in said third conduit means and electrically connected in said wheel-slide preventing circuit, said second electro-magnet valve device being operative, when deenergized, when said wheel-slide preventing circuit is open, for opening communication through said third conduit means, and being operative when energized, when said wheel-slide preventing circuit is closed, for closing communication through said third conduit and venting said brake applying means to atmosphere, piston means biased toward a release position in which said first biasing means is effective for moving said electrical switch means to its said different position, second biasing means for biasing said piston means toward its said release position, said piston means being subject to fluid pressure supplied to the speed regulator via said first conduit means and operable, in response to such fluid at a pressure sufficient for overcoming the combined opposing forces of both said first and second biasing means, to a retaining position in which said electrical switch means is held in its said one position, an electrical switch member associated with said wheel-spin and wheel-slide preventing circuits and biased toward a first position in which both circuits are open, said switch member being operable to a second position in which either the wheel-spin preventing circuit or the wheel-slide preventing circuit is closed, depending upon whether said switch means is in its said one position or its said different position, an inertia member having a normal position relative to the wheel-axle unit so long as the angular rate of speed of the wheel-axle unit corresponds to the linear rate of speed of the vehicle, said inertia member being operable, in response to the occurrence of a discrepancy between said angular and linear rates of speed, out of said normal position to a different position relative to the wheel-axle unit for causing operation of said switch member to its said second position, a third electro-magnet valve device interposed in said first conduit means, said third electro-magnet valve device being operative, when electrically energized, for opening communication through said first conduit means and, when deenergized, for interrupting communication therethrough and establishing a venting communication for relieving said piston means of fluid pressure acting thereon, an energizing circuit in which said third electro-magnet valve device and said switch member are electrically connected for effecting energization and deenergization of said third electro-magnet valve device when said switch member is in its said first and second positions, respectively, timing means for delaying said venting of fluid pressure acting on said piston means for a prescribed interval of time upon deenergization of said third electro-magnet valve device whereby untimely energization of said first electro-magnet valve device is prevented during wheel-spin preventing operation, and biasing means for restoring said switch member to its said first position upon restoration of said inertia member to its normal position.

12. The combination as defined in claim 11 wherein said inertia member comprises a flywheel coaxially and rotatably supported on one end of an axle consisting a portion of the wheel-axle unit, said flywheel being rotatable with said axle in a normal angular position relative to said axle, so long as said angular and linear rates of speed coincide, in which normal position of said flywheel the electrical switch member is in its said first position, said flywheel being capable of limited angular displacement relative to said axle responsively to a variance between said angular and linear rates of speed for causing operation of said electrical switch member to its said second position.

References Cited in the file of this patent
UNITED STATES PATENTS

| | | |
|---|---|---|
| 2,198,033 | Farmer | Apr. 23, 1940 |
| 2,321,059 | Anderson | June 8, 1943 |
| 2,379,289 | Farmer | June 26, 1945 |